United States Patent
Nishida et al.

(10) Patent No.: US 11,065,704 B2
(45) Date of Patent: Jul. 20, 2021

(54) ARC-TRACKING WELDING METHOD AND ARC-TRACKING WELDING APPARATUS

(71) Applicant: KOBE STEEL, LTD., Hyogo (JP)

(72) Inventors: Yoshiharu Nishida, Hyogo (JP); Tsutomu One, Hyogo (JP); Toshihiko Nishimura, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 238 days.

(21) Appl. No.: 16/090,803

(22) PCT Filed: Mar. 10, 2017

(86) PCT No.: PCT/JP2017/009826
§ 371 (c)(1),
(2) Date: Oct. 2, 2018

(87) PCT Pub. No.: WO2017/175541
PCT Pub. Date: Oct. 12, 2017

(65) Prior Publication Data
US 2020/0198041 A1 Jun. 25, 2020

(30) Foreign Application Priority Data
Apr. 4, 2016 (JP) .............................. JP2016-075181

(51) Int. Cl.
*B23K 9/00* (2006.01)
*B23K 9/02* (2006.01)
(Continued)

(52) U.S. Cl.
CPC .............. *B23K 9/0216* (2013.01); *B23K 9/09* (2013.01); *B23K 9/0956* (2013.01); *B23K 9/12* (2013.01); *B23K 9/127* (2013.01)

(58) Field of Classification Search
CPC .......... B23K 9/02; B23K 9/0216; B23K 9/09; B23K 9/095; B23K 9/0956; B23K 9/12;
(Continued)

(56) References Cited

U.S. PATENT DOCUMENTS

| | | | |
|---|---|---|---|
| 6,791,062 B1 * | 9/2004 | Brunner | B23K 9/1276 219/124.34 |
| 6,927,360 B2 * | 8/2005 | Artelsmair | B23K 9/126 219/124.22 |
| 2014/0001168 A1 * | 1/2014 | Cole | B23K 9/08 219/130.51 |

FOREIGN PATENT DOCUMENTS

| | | | |
|---|---|---|---|
| JP | S59-185575 A | | 10/1984 |
| JP | S60-118377 A | | 6/1985 |

(Continued)

OTHER PUBLICATIONS

International Search Report issued in PCT/JP2017/009826; dated Apr. 4, 2017.
Written Opinion issued in PCT/JP2017/009826; dated Apr. 4, 2017.

*Primary Examiner* — Sang Y Paik
(74) *Attorney, Agent, or Firm* — Studebaker & Brackett PC

(57) ABSTRACT

An arc-tracking welding method according to the present invention is an arc-tracking welding method in a consumable-electrode-type welding apparatus provided with a weaving function for swinging a torch in the welding direction, wherein a welding current and a welding voltage to be supplied to a consumable electrode include high-frequency components. A change in resistance value resulting from a fluctuation in electrode height is detected from the welding current and the welding voltage during welding. Then, a shift of a weld line is detected from information about the detected resistance value and both end positions of a weaving amplitude.

8 Claims, 9 Drawing Sheets

(51) Int. Cl.
  *B23K 9/09*    (2006.01)
  *B23K 9/095*   (2006.01)
  *B23K 9/12*    (2006.01)
  *B23K 9/127*   (2006.01)

(58) Field of Classification Search
  CPC ........ B23K 9/124; B23K 9/125; B23K 9/127;
                                        B23K 9/1272
  USPC ................... 219/124.1–124.5, 125.1–125.12,
              219/130.01–130.51, 136, 137 R, 137 PS,
                                                219/137.2
  See application file for complete search history.

(56)          References Cited

FOREIGN PATENT DOCUMENTS

JP        H09-262675 A    10/1997
JP        2010-120042 A    6/2010

\* cited by examiner

ARC-TRACKING WELDING METHOD AND ARC-TRACKING WELDING APPARATUS

TECHNICAL FIELD

The present invention relates to an arc-tracking welding method and an arc-tracking welding apparatus.

BACKGROUND ART

In arc welding, "arc-tracking" is used commonly in which a deviation of a wire tip position from a joining position of welding is detected on the basis of an electrical variation such as a welding current or a welding voltage and a welding line is followed automatically by correcting for the detected deviation. The arc-tracking is intended to prevent occurrence of welding detects and increase the ratio of automation by detecting and correcting for a deviation of the target position of a working tool (welding torch) due to a target work setting error, a working error, deformation during working, etc.

The above principle of arc-tracking utilizes the fact that the welding current or welding voltage varies according to a variation of the projection length of a welding wire (more correctly, a distance La from a torch power supply position to a base material). More specifically, a deviation of the torch target position is detected on the basis of asymmetry of an arc current waveform or an arc voltage waveform during a weaving operation. The detected deviation is fed back to an automatic welding apparatus or a welding robot system and a correction is made in such a direction that the deviation of the torch tip position is canceled out. A welding line is automatically followed in this manner.

As an example of such arc-tracking control, Patent document 1 discloses "a tracking parameter setting method of an arc sensor for a robot and a tracking parameter setting method of an arc sensor for a robot."

Patent document 1 discloses a method for setting tracking parameters of an arc sensor for a robot, characterized by comprising a moving step of moving, in moving a welding torch along a teaching line that is divided into plural sections having different shifts while causing the welding torch to perform welding, the welding torch by shifting it according to the shifts that are determined for the respective sections; an averaging step of averaging amounts of electricity that are supplied to the moving welding torch and sampled for the respective sections in each prescribed period that is longer than a period of the sampling; a difference calculating step of calculating differences between averages and a reference value; an average difference calculating step of calculating an average difference of the differences of the respective sections; a regression line and correlation coefficient acquiring step of determining, on the basis of the average difference of the differences of the respective sections, a regression line and a correlation coefficient between the regression line and the average difference; and an evaluating step of evaluating parameters relating to a gradient and an intercept of the regression line on the basis of the correlation coefficient and setting the parameters as tracking parameters.

PRIOR ART DOCUMENTS

Patent Documents

Patent document 1: JP-A-2010-120042

SUMMARY OF THE INVENTION

Problems to be Solved by the Invention

As described above, the arc-tracking is a feedback control for position-correcting an operation locus of a torch tip perpendicularly to a welding line according to a variation of a welding current or a welding voltage. However, as described below, as for application of the arc-tracking to actual welding sites, application results show that various problems exist.

That is, conventional techniques of arc-tracking welding have the following problems:

Merely checking a difference between welding current values at the ends on the left and right of a joining position (groove) results in a small S/N ratio; further increase in accuracy is necessary.

Further increase in accuracy is necessary in, for example, a case where the weaving amplitude, in particular, is small for the leg length of a welding wire and a case where the thickness of target plates is small.

Arc-tracking based on simple resistance value detection cannot produce a useful resistance value variation because of, for example, influence of a control loop.

The present invention has been made in view of the above circumstances, and an object of the invention is therefore to provide a technique that enables accurate arc-tracking even in a welding site.

Means for Solving the Problems

To attain the above object, the arc-tracking welding method according to the invention is provided with the following technical means.

That is, the arc-tracking welding method according to the invention is an arc-tracking welding method in a consumable electrode type welding apparatus having a weaving function of swinging a torch with respect to a welding direction, including: causing a welding current and a welding voltage supplied to a consumable electrode to include a high-frequency component having a frequency higher than a frequency of the weaving; detecting values of the welding current and the welding voltage during welding; determining a resistance value on the basis of the detected values of the welding current and the welding voltage; and detecting a deviation from a welding 1 of the torch on the basis of the determined resistance value and information relating to both end positions of an amplitude of the weaving.

It is preferable that the high-frequency component is set larger than a DC component of the welding current or the welding voltage supplied to the consumable electrode. It is preferable that a frequency of the high-frequency component is 100 Hz or higher.

It is also possible that the welding current and the welding voltage supplied to the consumable electrode have pulse waveforms and a high-frequency component included in the pulse waveforms is used as the high-frequency component.

The arc-tracking welding apparatus according to the invention is provided with the following technical means.

That is, the arc-tracking welding apparatus according to the invention is a consumable electrode type welding apparatus having a weaving function of swinging a torch with respect to a welding direction and an arc-tracking function, including a welding power source configured to supply a welding current and a welding voltage to a consumable electrode and to have the welding current and the welding voltage include a high-frequency component having a frequency higher than a frequency of the weaving; a current detector which detects a value of the welding current during welding; a voltage detector which detects a value of the welding voltage during the welding; and a deviation detector which detects a deviation from a welding line of the torch, wherein the deviation detector detects a resistance value on the basis of values of the welding current and the welding voltage during the welding that are obtained from the welding current value detected by the current detector and the welding voltage value detected by the voltage detector, and detects a deviation from a welding line of the torch on the basis of the determined resistance value and information relating to both end positions of an amplitude of the weaving.

Advantages of the Invention

The use of the technique of the arc-tracking welding method and arc-tracking welding apparatus according to the invention makes it possible to perform accurate arc-tracking even in a welding site.

MODES FOR CARRYING OUT THE INVENTION

An arc-tracking welding method and an arc-tracking welding apparatus according to an embodiment of the present invention will be hereinafter described in detail with reference to the drawings.

Although the following description will be directed to a case where an apparatus that performs a welding operation is an articulated robot that causes a welding torch 1 to perform a weaving operation with respect to a welding direction, this is just an example and the apparatus that performs a welding operation may be a dedicated automatic welding apparatus.

Figure 1:
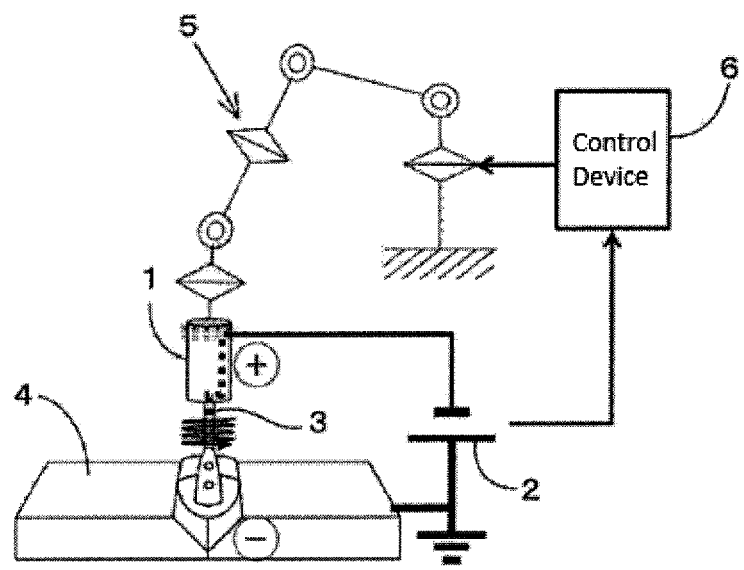
FIG. 1 is a diagram schematically showing the system configuration of a welding robot.

The arc-tracking welding method according to an embodiment is applied to a vertical articulated robot system, for example. The configuration of the robot system is schematically shown in FIG. 1. The vertical articulated robot system will be outlined below.

FIG. 1 is a diagram showing the configuration of a tracking system using a welding robot 5.

The vertical articulated robot system includes the welding robot 5 and a control device 6 that is equipped with a teaching pendant (not shown). The welding robot 5 is a vertical articulated 6-axis industrial robot and is equipped with, at a tip, a welding tool including a welding torch 1 etc. The welding robot 5 may be mounted on a slider for moving it.

The control device 6 controls the welding robot 5 according to a program about which the control device 6 has been taught in advance. The program is generated using a teaching pendant connected to the control device 6 or an offline teaching system that utilizes a personal computer. In either case, the program is generated in advance of an actual operation. The program generated by a personal computer is transferred to the control device 6 via a storage medium or the like or by a data communication.

The arc-tracking welding method according to the embodiment is implemented in a form of a program provided in the control device 6.

Figure 2:
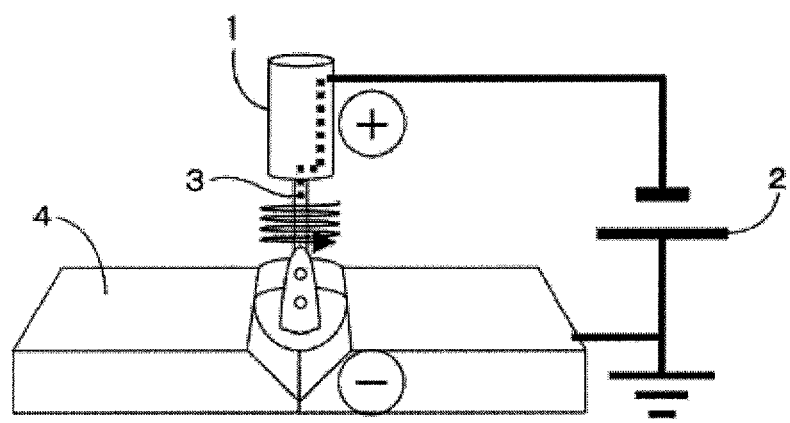
FIG. 2 is an explanatory diagram schematically illustrating arc-tracking welding.

FIG. 2 is a schematic diagram showing arc welding.

In arc welding, an arc is generated between a base material 4 and a welding wire 3 (consumable electrode) supplied from a welding torch 1 by applying a voltage between the welding wire 3 and the base material 4 by a welding power source 2. Welding is performed while the welding wire 3 and the base material 4 are melted by arc heat. Since the welding wire 3 melts down as arc welding is performed, during welding the welding wire 3 continues to be supplied from a supply device past the inside of the welding torch 1. That is, this arc welding is consumable electrode type welding.

Welding metal produced by a molten portion of the base material 4 and the welding wire 3 solidifies to form a welding bead, whereby strong welding is attained. In welding between medium-thickness plates as typified by welding between thick steel plates, to obtain necessary strength of a welded portion, it is necessary to set the width of a welding bead large and secure a necessary amount of deposited metal and penetration depth. To this end, in welding between medium-thickness plates, welding is performed while an operation called weaving is performed in which the welding torch 1 is swung in the left-right direction. Thus, the width of a welding bead is increased and necessary welding strength is secured.

The control device 6 outputs, to the welding robot 5, an instruction signal for a weaving operation of the welding torch 1.

The welding power source 2 can output a desired, pre-programmed voltage waveform. For example, the welding power source 2 can output a waveform on which a waveform having a prescribed frequency is superimposed. The power source 2 incorporates a voltage detector and a current detector (neither of which is shown), and the welding power source 2 can measure a voltage and a current that are output actually (i.e., welding voltage and welding current).

The torch 1 also supplies a shield gas, whereby an arc column is protected from the air. Molten metal produced by welding is also protected from the air by virtue of the presence of gas that is generated by decomposition of flux contained in the welding wire 3, whereby formation of welding defects such as a blow hole is suppressed.

On the other hand, in the field of welding with medium-thickness plates, it is not always the case where a welding line where welding should be performed is located at a determined position due to any of various reasons that, for example, the processing accuracy is low because of shutoff of gas supply to a welding work, the setting accuracy is low because of a failure of jig correction on a welding work, and a welding work is deformed due to thermal strain because of a failure of jig restriction during welding. Deviation from a welding line is approximately on the order of several millimeters to centimeters.

However, from the viewpoint of welding quality, in general, the allowable deviation from a welding line in arc welding robots in the field of thick plates is small than 1 mm. Playback-type robots that perform welding at predetermined positions cannot attain welding quality of such a level. That is, in welding robots for medium-thickness plates, it is an essential condition to detect a deviation between a pre-taught welding position and a welding position of an actual work in real time by a deviation detector and tracking along a welding line is performed on the sub-millimeter order so as to adapt to every detected deviation. This is one of indispensable, very important functions required for such welding robots.

Figure 3A:
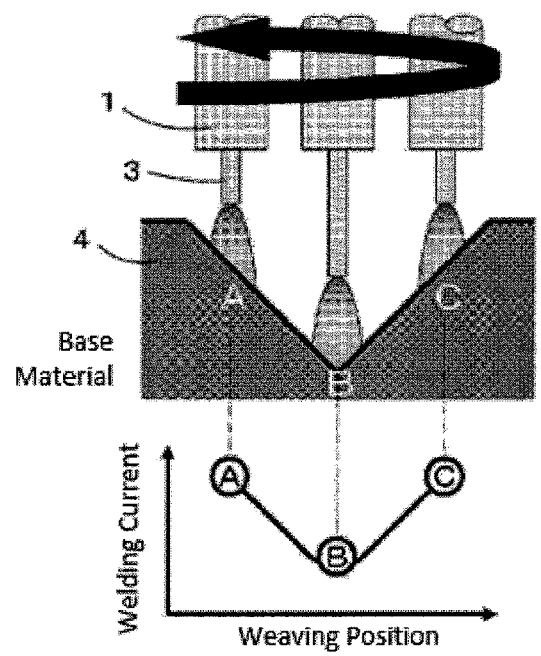
FIG. 3A is an explanatory diagram illustrating the principle of arc-tracking.
Figure 3B:
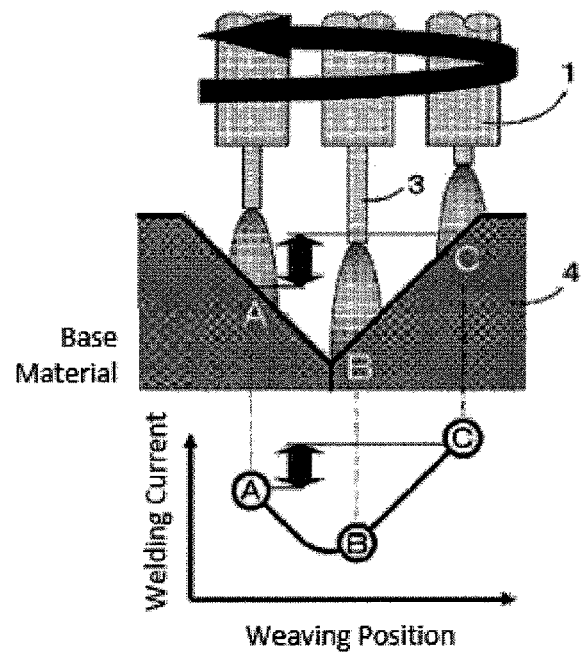
FIG. 3B is another explanatory diagram illustrating the principle of arc-tracking.

FIG. 3A and FIG. 3B are explanatory diagrams illustrating the principle of arc-tracking schematically.

As shown in FIG. 3A, when weaving operation is performed, the distance between the welding torch 1 and the base material 4 (hereinafter called a "torch height") varies depending on the weaving position. When a constant voltage control is performed on the welding power source 2 (see FIG. 2), the welding current also varies depending on the weaving position as the torch height varies. Or when a constant current control is performed on the welding power source 2 (see FIG. 2), the welding voltage also varies depending on the weaving position as the torch height varies. Where a weaving center B coincides with a welding line, the welding current varies in a left-right symmetrical manner with respect to the weaving center B as shown in the figure and have the same value at both end positions (weaving end points) A and C of a weaving amplitude. The state that the welding current have the same value at the weaving end points A and C have the same value is a normal state.

On the other hand, as shown in FIG. 3B, where a weaving center B is deviated from a welding line, a difference occurs between welding currents at weaving end points A and C because of a torch height difference there. The arc-tracking is a function of following a welding line while detecting a current difference between end points and correcting a pre-taught weaving center.

In the embodiment, a program for calculating (estimating) such a deviation is installed in the control device 6 shown in FIG. 1. A method for determining such a deviation will be described below.

Figure 4:
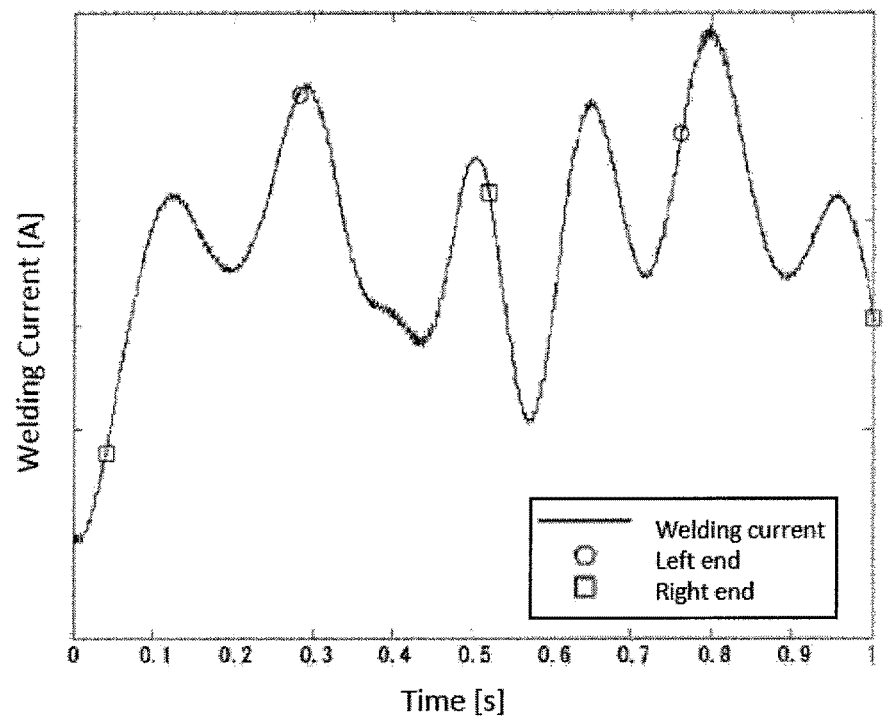
FIG. 4 is a graph showing a variation in a current value at end positions located on the left and right of a joining position in a conventional technique.

FIG. 4 shows a current waveform in a case where a constant-voltage welding power source 2 for arc welding is used.

FIG. 4 shows a welding current waveform in a case where a weaving operation was performed with a period of 1 sec and an amplitude of 2 mm with the weaving center deviated from a welding line intentionally. Since the weaving center is always deviated by 2 mm, theoretically the difference between welding currents at the left and right ends should be constant. However, it is seen from FIG. 4 that the current waveform itself has a large current variation as compared with the difference between welding currents at the left and right ends, and that the current value varies greatly when a small phase deviation occurs between the left and right ends; that is, the SN ratio (signal-to-noise ratio) is very small.

On the other hand, since a torch height difference results in variations other than a current value variation, such as a resistance value variation, it is conceivable to estimate a deviation from a welding line on the basis of a difference between torch heights at the left and right ends by detecting resistance values.

Figure 5:
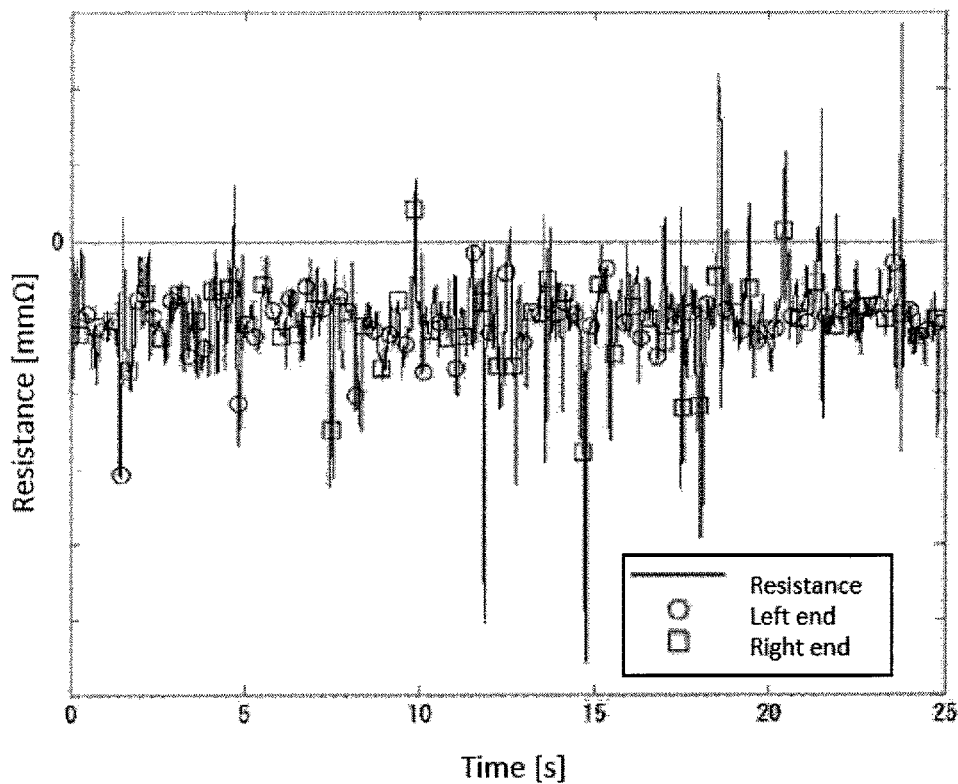
FIG. 5 is a graph showing a resistance value estimation result using current and voltage waveforms obtained in the conventional technique using a welding power source that generates a constant voltage.

FIG. 5 shows a result of estimation of a resistance value R that is given by the following Equation (1) in which voltage information V was used in addition to the same current information I as shown in FIG. 4 that was obtained using the constant-voltage welding power source 2.

[Math. 1]

$$V(t) = R \times I(t) \tag{1}$$

FIG. 5 is a graph showing a resistance value estimation result using current and voltage waveforms obtained with the conventional constant-voltage welding power source. This figure, in which the resistance value varies to a large extent, does not contain useful information. Where the magnitude of the deviation is constant, theoretically the difference between resistance values at the left and right ends should remain constant. However, in FIG. 5, the difference between resistance values at the left and right ends has a large variation. It is seen from FIG. 5 that a deviation from the welding line cannot be detected at all.

The average of the resistance value, which should be a positive value, has a negative value. This is due to a negative feedback control that to increase the stability of the welding the welding power source 2 decreases the voltage value as the current value increases (see FIG. 6). The average of the resistance value has a negative value because the negative feedback acts as if to have a negative resistance value. As is understood from the above discussion, when a resistance value is estimated simply according to Equation (1) using an ordinary current waveform of the welding power source 2, influence of the control loop is merely detected and the difference between resistance values at the left and right ends cannot be detected as a useful value.

To summarize the above discussion, the conventional arc-tracking welding technique has the following problems:

Merely checking the difference between welding current values at the ends on the left and right of a joining position results in a small S/N ratio; further increase in accuracy is necessary.

Further increase in accuracy is necessary in, for example, a case where the weaving amplitude, in particular, is small for the leg length of the welding wire 3 and a case where the plate thickness is small.

Arc-tracking based on simple resistance value detection cannot produce a useful resistance value variation because of, for example, influence of the control loop.

In view of the above, the embodiment employs a deviation detection method that uses the following technique and thereby enables accurate arc-tracking welding even in a welding site.

The essence of this technique is to cause a welding current and a welding voltage supplied to a consumable electrode to include a high-frequency component, detect a resistance value variation resulting from an electrode height variation on the basis of a welding current and a welding voltage occurring during welding, and a deviation from a welding line is detected on the basis of the detected resistance value variation and left and right positions of weaving.

The welding power source 2 is controlled so that a welding current and a welding voltage include a frequency component having a frequency higher than a weaving frequency. Furthermore, the detection accuracy of a resistance value variation is increased by setting the high-frequency component larger than a DC component of the welding current or welding voltage.

One method for controlling the welding power source 2 so that a high-frequency component is included is to have a voltage instruction value or a voltage instruction value supplied to the welding power source 2 include a corresponding high-frequency component. Another method for controlling the welding power source 2 is that a pulse waveform is employed as a welding current and a welding voltage supplied to the consumable electrode, and a high-frequency component included in the pulse waveform is used as the above-mentioned high-frequency component.

It is preferable that the frequency of the high-frequency component is 100 Hz or higher.

Figure 6:
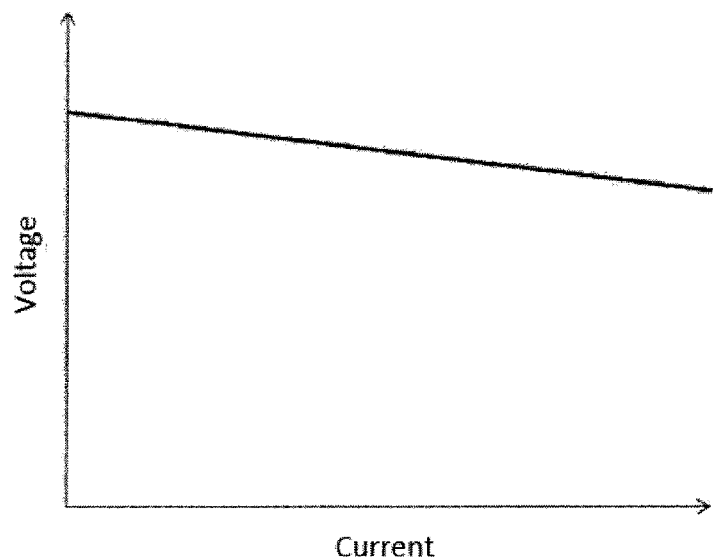
FIG. 6 is a graph showing a constant voltage characteristic of e welding power source.

Employing, as mentioned above, the technique of having a welding current or a welding voltage include a high-frequency waveform makes it possible to estimate a resistance value in a high-frequency range without being affected by a negative feedback control appearing in the constant voltage characteristic shown in FIG. 6.

The technique of this application will be described in detail by way of Examples (Example 1 to Example 3).

EXAMPLES

Example 1

In Example 1, the welding power source 2 was caused to generate a current value on which a high-frequency waveform of 300 Hz was superimposed and a resistance value was estimated according to Equation (1). A result is shown in FIG. 7.

Figure 7:
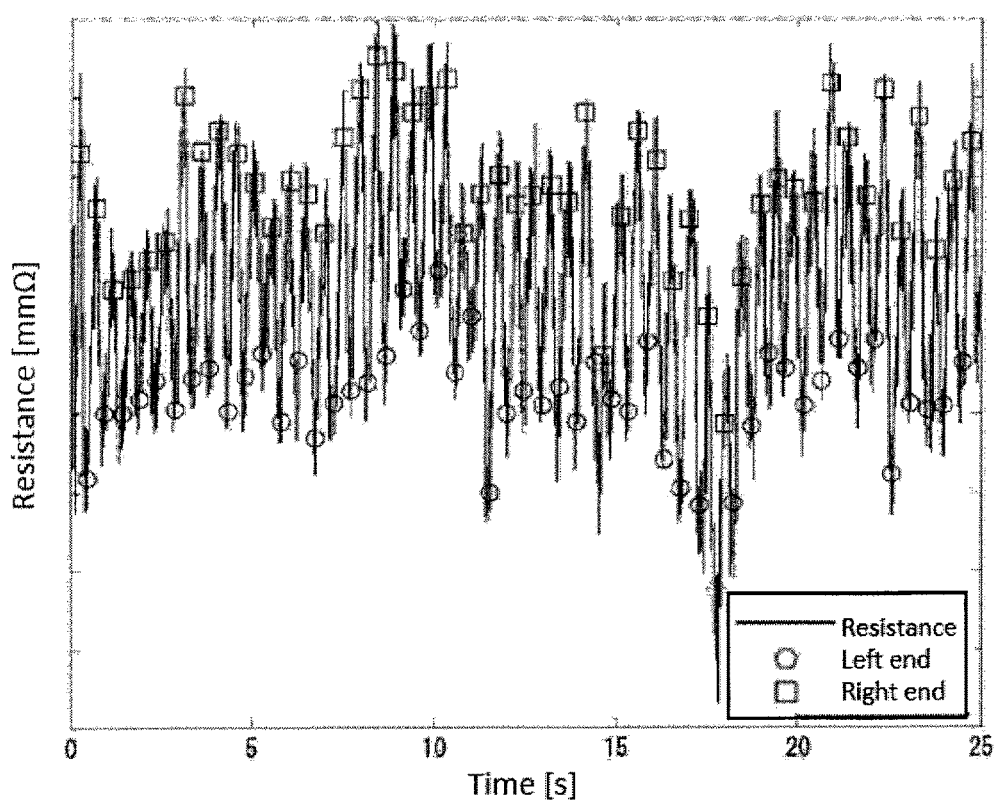
FIG. 7 is a graph showing a result of estimation of a resistance value R from current and voltage waveforms on which a high-frequency wave was superimposed.

The waveform shown in FIG. 7 shows resistance values calculated according to Equation (1). Circular marks in FIG. 7 correspond to a state that the electrode tip is located at the end on the left side of a welding line (the left ends A in FIG. 3A and FIG. 3B), and square marks in FIG. 7 correspond to a state that the electrode tip is located at the right end of a groove (the right ends C in FIG. 3A and FIG. 3B). The meanings of circular marks and square marks to be used in drawings to be referred to below are the same as the above.

A time point when the electrode tip is located at an end is recognized as a time point of an instruction to place the electrode tip at the end in a weaving instruction signal that the control device outputs to the robot plus an operation delay of the robot.

It was understood from the result shown in FIG. 7 that a variation of the resistance R that could not detected conventionally (see FIG. 5, for example) can be recognized by superimposing a high-frequency waveform on a current or voltage supplied from the welding power source 2.

Furthermore, since an offset voltage Vo and an inductance L are thought to have some influence during welding in addition to the resistance value R, the resistance value R was estimated according to Equation (2) in place of Equation (1). A result is shown in FIG. 8.

[Math. 2]

$$V(t) = R \times I(t) + L \times \frac{dI(t)}{dt} + V_O \tag{2}$$

Figure 8:
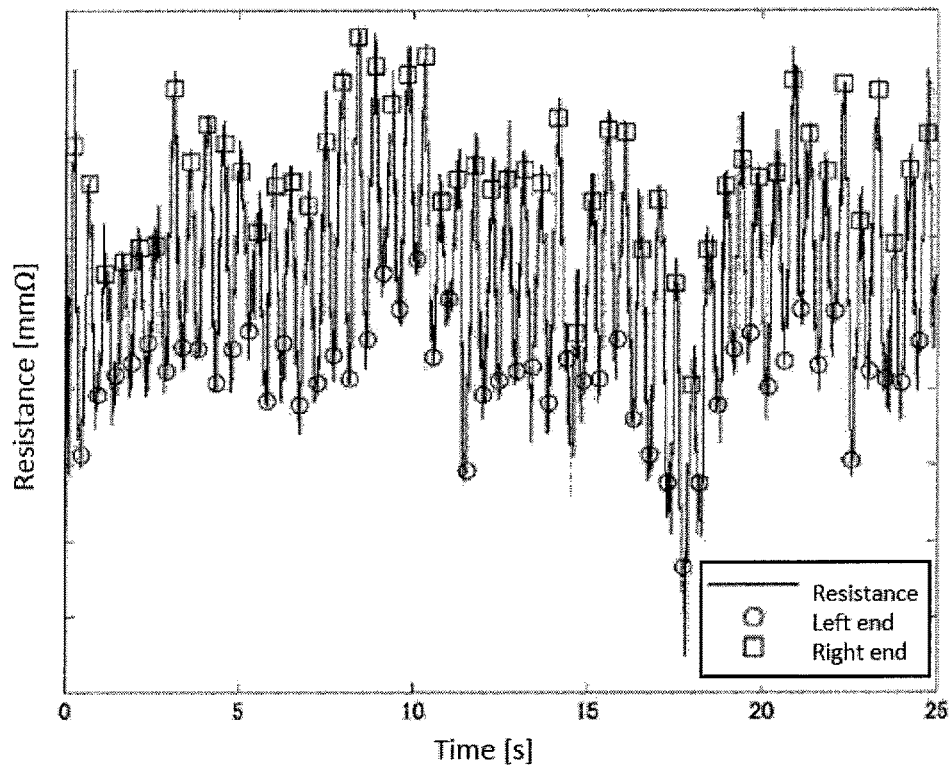
FIG. 8 is a graph showing a result of estimation of a resistance value R, an inductance L, and an offset voltage Vo from current and voltage waveforms on which a high-frequency wave was superimposed, in Example 1 of the invention.

It is seen that noise with respect to resistance R estimation results is smaller in FIG. 8 than in FIG. 7. This is mainly thought to be a result of taking the inductance L into consideration.

For example, R, L, and Vo can be estimated according to the following Equation (4) based on the relationship of the following Equation (3):

[Math. 3]

$$\begin{bmatrix} I(t_1) & \frac{dI(t_1)}{dt} & 1 \\ I(t_2) & \frac{dI(t_2)}{dt} & 1 \\ \vdots & \vdots & \vdots \\ I(t_n) & \frac{dI(t_n)}{dt} & 1 \end{bmatrix} \times \begin{bmatrix} R \\ L \\ V_O \end{bmatrix} = \begin{bmatrix} V(t_1) \\ V(t_2) \\ \vdots \\ V(t_n) \end{bmatrix} (t_1 < t_2 < \ldots < t_n) \tag{3}$$

$$A \times \begin{bmatrix} R \\ L \\ V_O \end{bmatrix} = B$$

[Math. 4]

$$\hat{P} = (A^T \times A)^{-1} \times A^T \times B, P = \begin{bmatrix} R \\ L \\ V_O \end{bmatrix} \tag{4}$$

However, R, L, and Vo thus estimated are averaged estimation values over an interval of $t_1$ to $t_m$. The degree of smoothing and a pass frequency band can be changed by changing the averaging interval 1 to n. In the case being discussed, since it is desired to pass the high-frequency waveform, it is appropriate to select n so as to pass the superimposed high-frequency waveform.

Whereas the above method is such that one-shot type least squares estimation is performed every time, it is also possible to use a recursive least squares method. In the one-shot type method, whereas estimation can be performed without being affected by past data before $t_1$, the amount of calculation is large. On the other hand, the least squares method is advantageous in that the amount of calculation is very small though it is affected by past data to some extent. The estimation by the recursive least squares method is expressed by the following Equations (5):

[Math. 5]

$$K_i = \frac{M_i \times A(i,:)}{\lambda + A(i,:)^T \times M_i \times A(i,:)}$$

$$M_i = \frac{(M_{i-1} - K_i \times A(i,:)^T \times M_{i-1})}{\lambda}$$

$$P_i = P_{i-1} - K_i \times (A(i,:) \times P_{i-1} - B(i,:))$$

(5)

In the Equations (5), Pi is estimated values of $[R, L, Vo]^T$ of an ith recursive calculation. A(i,:) is an ith-row vector of the matrix A and, likewise, B(i,:) is an ith-row vector of the matrix B. And $\lambda$ is a forgetting coefficient.

The estimation result shown in FIG. 8 was obtained by the above recursive least squares method (the forgetting coefficient was given so as to be approximately equal to 0.1 sec).

Figure 10:
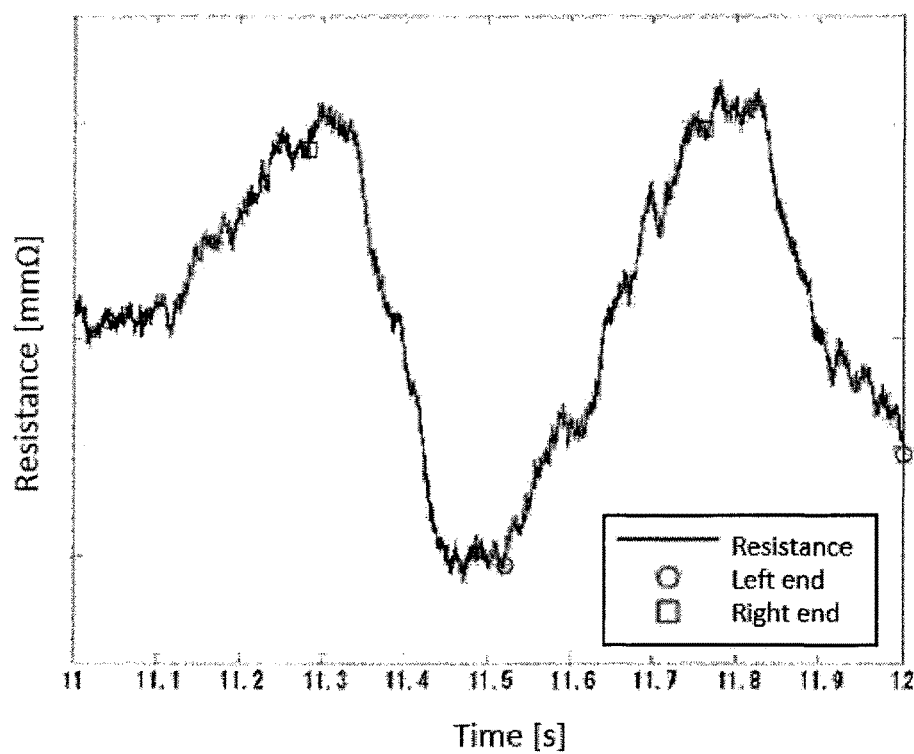
FIG. 10 is an enlarged version of the graph shown in FIG. 8.
Figure 15:
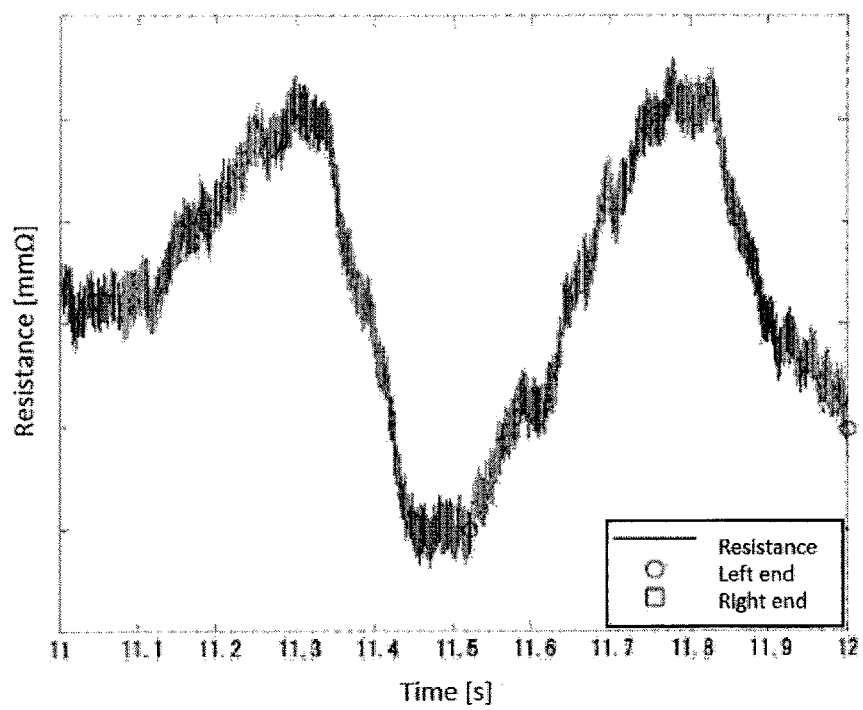
FIG. 15 is an enlarged version of the graph shown in FIG. 7.

Comparison between FIG. 7 (only R was estimated) and FIG. 8 (R, L, and Vo were estimated) does not produce a clear difference in noise level. Enlarged versions of the graphs shown in FIG. 8 and FIG. 7 were drawn as FIG. 10 and FIG. 15, respectively. It is seen from comparison between FIG. 15 (only R was estimated) and FIG. 10 (R, L, and Vo were estimated) that the result shown in FIG. 10 is clearly smaller in noise.

As described above, in Example 1, a high-frequency wave is superimposed and resistance values R are estimated on the basis of current and voltage waveforms without using a filter for eliminating the superimposed high-frequency component. It has become possible to increase the SN ratio by detecting a deviation from a welding line on the basis of the difference between resistance values at the left and right ends using resistance values thus estimated.

It is appropriate to determine a relationship between the difference between resistance values at the left and right ends and the deviation from a welding line empirically in advance.

Figure 9:
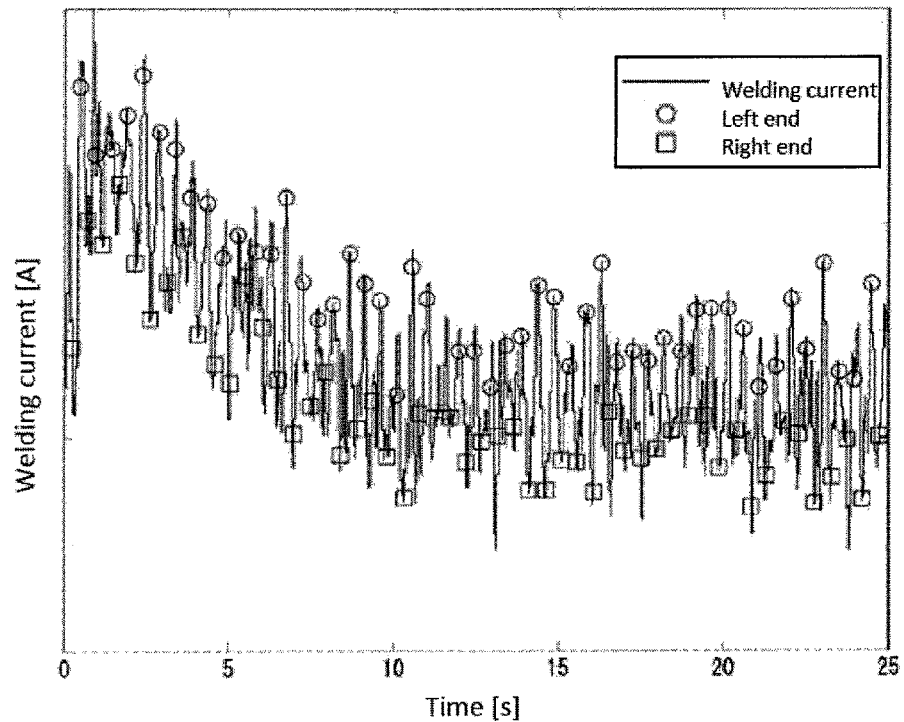
FIG. 9 is a graph showing differences between current values at end positions on the left and right of a joining position in Comparative Example in which high-frequency elimination was used for suppress a variation due to a high-frequency wave.

On the other hand, FIG. 9 shows a result of detection of the difference between currents detected at the ends on the left and right of a welding line (Comparative Example).

The current waveform shown in FIG. 9 was obtained by performing filtering processing for cutting the high-frequency component on the same current waveform as was used for determining the resistance values shown in FIG. 8. This is because the high-frequency component only serves as noise. Differences between current values at the end points were compared with each other with compensation of phase deviations at the end points caused by the filter.

Figure 11:
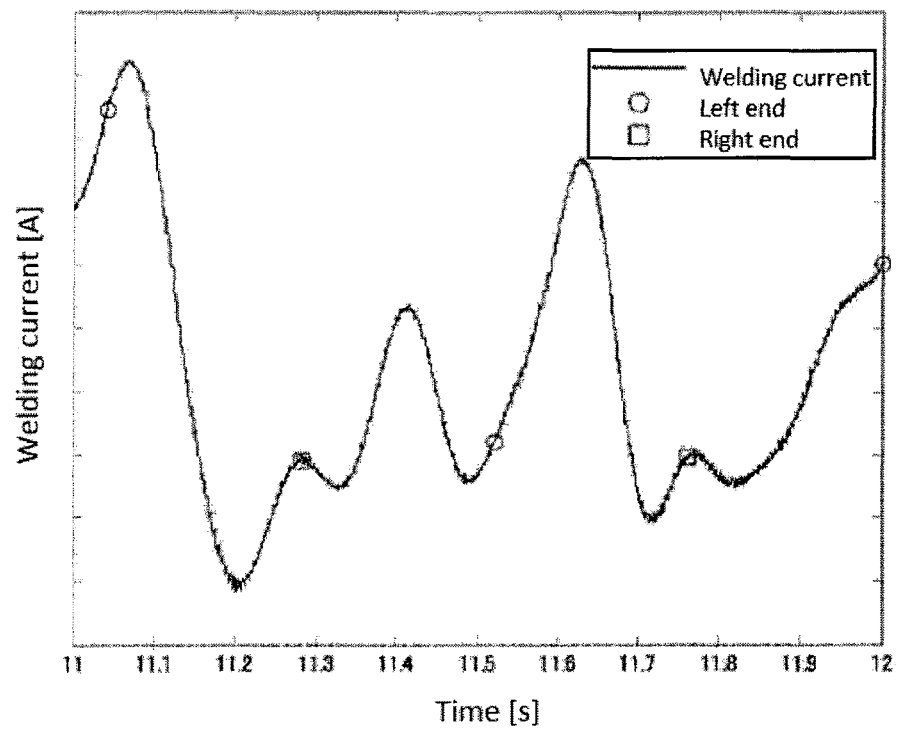
FIG. 11 is an enlarged version of the graph shown in FIG. 9.

FIG. 11 is an enlarged version of FIG. 9. As seen from this figure, current value variations at locations other the end points are large for the differences between current values at the end points and hence there are pairs of end points where a useful current difference cannot be obtained. FIG. 10 is an enlarged version of FIG. 8 and shows a result of this Example. It is seen that resistance value variations at the end points in FIG. 10 are larger than in FIG. 11 and hence the case of FIG. 10 enables high-sensitivity detection of a deviation from a welding line.

Figure 13:
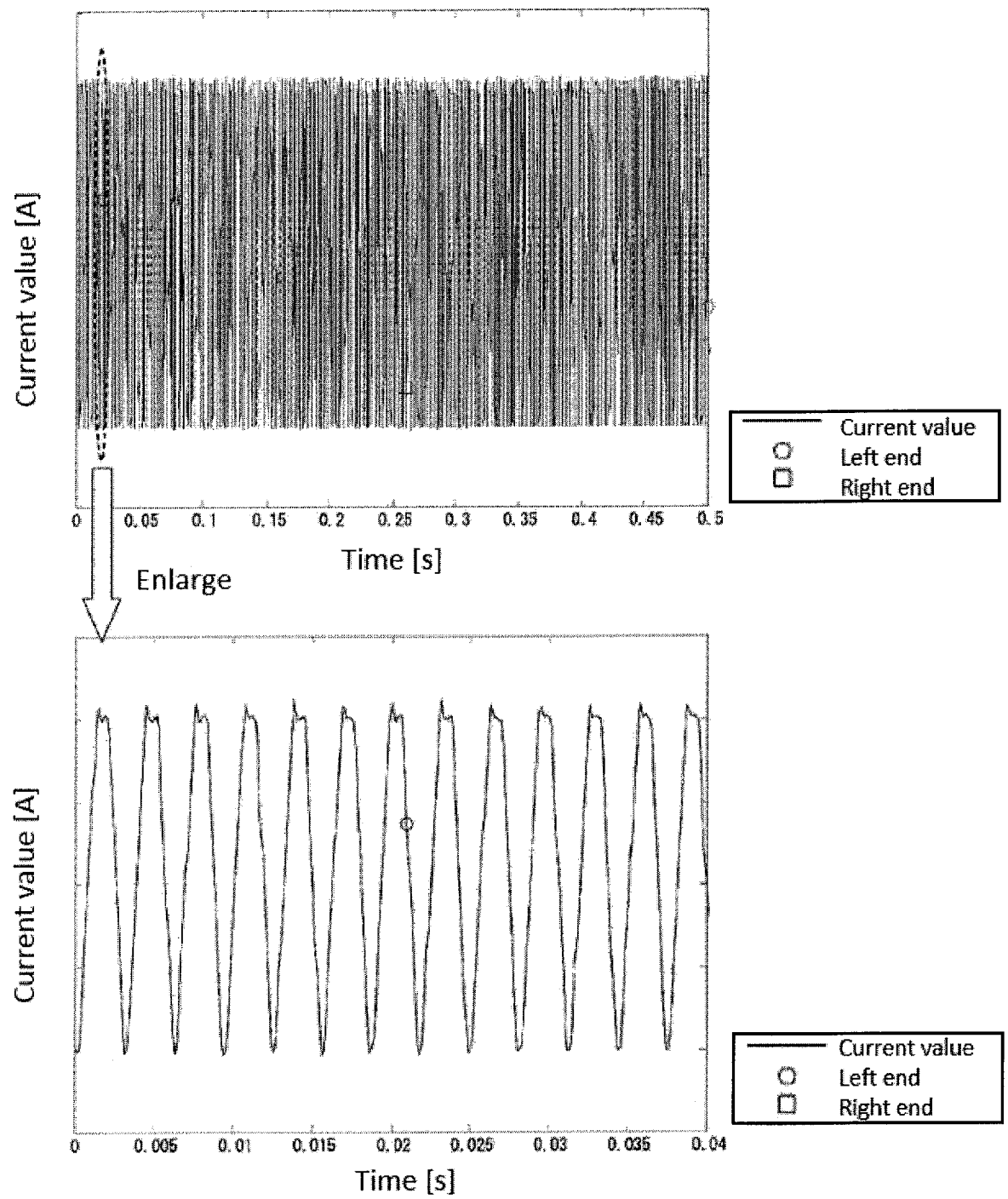
FIG. 13 is a graph showing a current value obtained using a pulsed power source and a graph showing an enlarged part of the former.

When current values are detected while a high-frequency component is left, as shown in FIG. 13 current values at the end points vary to a large extend due to influence of the high-frequency wave. Even a slight shift in time causes a current value variation. Thus, current values at the left and right ends cannot be recognized correctly.

Figure 14:
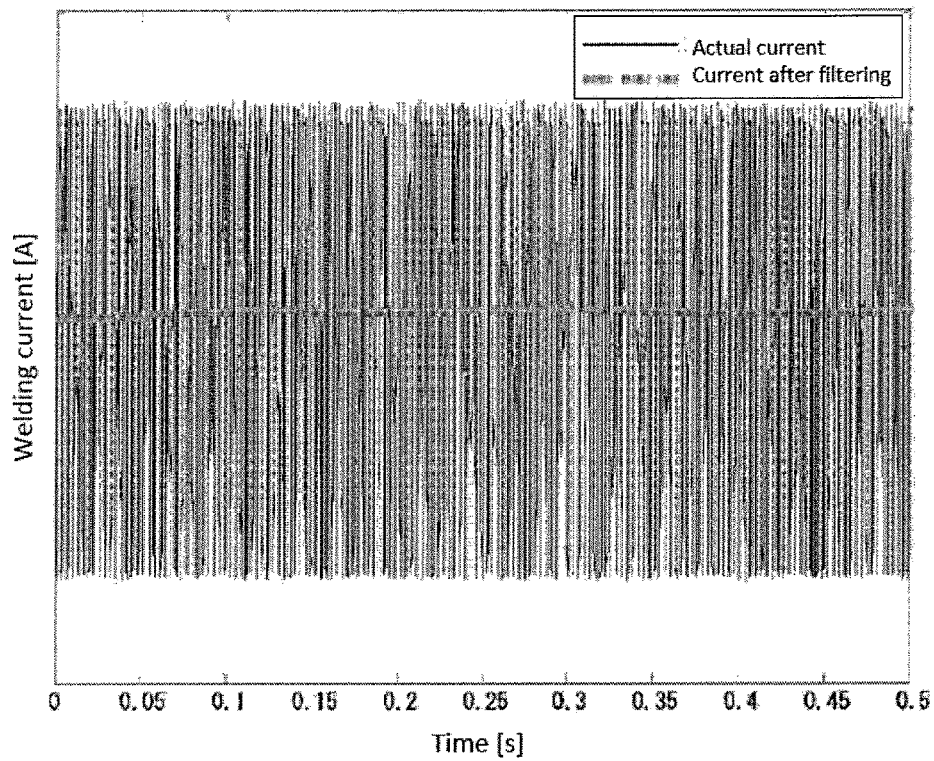
FIG. 14 is a graph showing a waveform obtained by filtering a current value obtained using a pulsed power source.

As a result, in the prior art, in the case where current values are used, differences between current values at the end points can be detected as shown in FIG. 9 by using a current waveform obtained by performing filtering processing of cutting a large part of a high-frequency component (see FIG. 14).

In other words, whereas in the prior art a high-frequency component is merely noise that should be eliminated, in the technique of the embodiment estimation of resistance values R can be realized by utilizing a high-frequency component positively.

In the prior art, the current value increases as the torch height decreases and, conversely, the resistance value decreases as the torch height decreases. This means that deviation from a welding line is on the left side or the right side where the resistance value is smaller. Arc-tracking is enabled by correcting the torch position to the direction opposite to the deviation direction.

Example 2

Whereas in Example 1 a high-frequency component is superimposed on a constant current, in Example 2 a pulse waveform is employed as an output current waveform of the welding power source 2 and a high-frequency component of the pulse waveform is used instead of superimposing a high-frequency component additionally.

Figure 12:
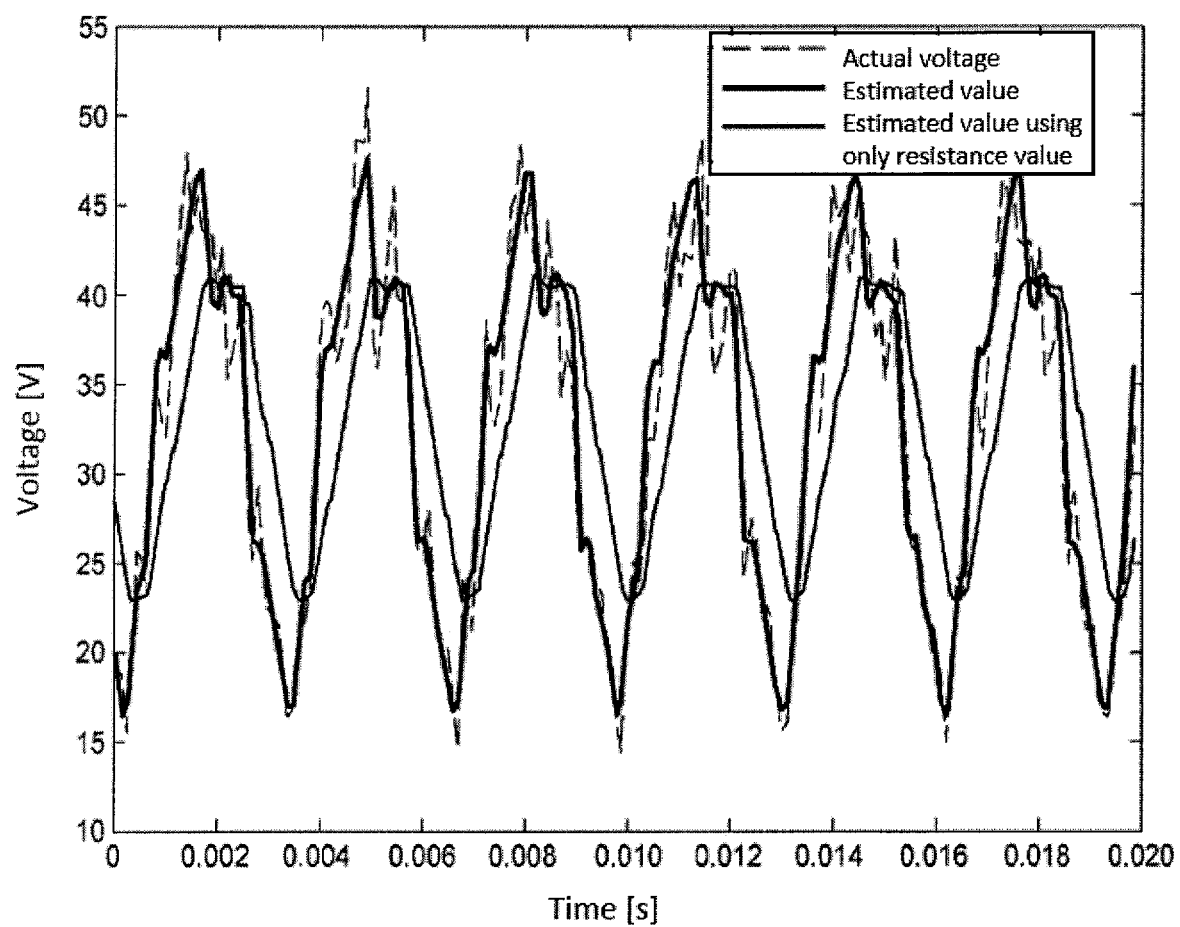
FIG. 12 is a graph showing a result of estimation of a voltage value of a pulsed power source in Example 2 according to the invention.

FIG. 12 shows a result of back calculation of a voltage V from estimation values of $[R, L, Vo]^T$ calculated by the sequential estimation according to Equations (5) in the above settings. It is seen that the actual voltage which includes a high-frequency component varies to a large extent because the current value is varied in pulse form and a voltage can be estimated with high accuracy by estimating the actual voltage using $[R, L, Vo]^T$. On the other hand, it is seen that a resistance R can be estimated by the estimation according to Equation (1) which uses only the resistance value, like values of $[R, L, Vo]^T$ are estimated.

Example 3

Whereas in Examples 1 and 2 an attention is paid to only the difference between estimated resistance values R at the left end and the right end, resistance to noise can be increased further and an even larger SN ratio can be attained by using information other than values at the left end and the right end (e.g., calculating an average of values obtained in the vicinity of each of the left end and the right end).

As an example other than calculating an average of values obtained in the vicinity of each of the ends on the left and right of a welding line, it is possible to employ a conventional technique that is directed to the welding current. As such a conventional technique, JP-A-H05-177353 discloses a tracking technique using a neural network having a welding current waveform as an input. For example, tracking that is higher in accuracy than in the case of using the welding current can be realized by constructing a neural network based on a resistance value R waveform instead of a welding current waveform.

The above-described arc-tracking welding method is suitable for welding with tracking that is performed by a welding robot.

Things to which attention should be paid will be described below.

First, both of the estimation according to Equation (1) (only R is used) and the estimation according to Equation (2) (R, L, and Vo are used) require a high-frequency component that is higher in frequency than a control band of the welding power source 2. Also in the case of using a pulse waveform, when current and voltage values that are taken in by a robot controller are values obtained by eliminating noise (high-frequency components) by a lowpass filter, estimation of a resistance value R is difficult in a situation that a control is made so as to provide a constant voltage characteristic of FIG. 6.

Next, in the tracking system using the welding robot 5, the control device 6 for the robot samples welding currents and voltages from the welding power source 2. However, the sampling period is as long as several milliseconds to several tens of milliseconds and is not sufficiently short for the frequency of a pulse waveform that is output from the welding power source 2.

Where the sampling period is not sufficiently short, erroneous signal processing may be performed due to aliasing, for example.

In particular, in contrast to the estimation according to Equation (1) (only R is used), in the estimation according to Equation (2) that requires a differentiation value relating to L, the sampling period needs to be sufficiently short for a pulse frequency (or the frequency of a superimposed high-frequency component). For example, the sampling period needs to be such that the pulse frequency is sufficiently high as not to cause aliasing.

In the estimation according to Equation (2), it is appropriate to sample current differentiation values in addition to values of a current and a voltage supplied from the welding power source 2.

Whereas usually calculations necessary for tracking (including estimation of resistance values) is performed by the control device 6 for the robot, in the embodiment it is appropriate to perform estimation of resistance values by a computing device provided in the welding power source 2. This measure may be taken in the estimation according to Equation (1) (only R is used), and is particularly important in the estimation according to Equation (2) (L is involved).

The present application is based on Japanese Patent Application No. 2016-75181 filed on Apr. 4, 2016, the disclosure of which is incorporated herein by reference.

DESCRIPTION OF SYMBOLS

1: Welding torch
2: Welding power source
3: Welding wire
4: Base material
5: Welding robot
6: Control device

The invention claimed is:

1. An arc-tracking welding method in a consumable electrode type welding apparatus comprising a weaving function of swinging a torch with respect to a welding direction, the method comprising:

causing a high-frequency component having a frequency higher than a frequency of the weaving to be superimposed on a welding current supplied to a consumable electrode;

detecting a value of the welding current during welding;

determining a resistance value variation on the basis of a difference between resistance values resulting from a height variation of the consumable electrode at left and right ends of the consumable electrode at left and right positions of the weaving from the detected value of the welding the detected value of the welding current; and detecting a deviation of a weaving center from a welding line on the basis of the determined resistance value variation and information relating to both end positions of an amplitude of the weaving.

2. The arc-tracking welding method according to claim 1, wherein the high-frequency component is larger than a DC component of the welding current supplied to the consumable electrode.

3. The arc-tracking welding method according to claim 1, wherein the welding current supplied to the consumable electrode has pulse waveforms and a high-frequency component included in the pulse waveforms is used as the high-frequency component.

4. The arc-tracking welding method according to claim 1, wherein a frequency of the high-frequency component is 100 Hz or higher.

5. A consumable electrode type welding apparatus having a weaving function of swinging a torch with respect to a welding direction and an arc-tracking function, comprising:

a welding power source configured to superimpose a high-frequency component having a frequency higher than a frequency of the weaving on a welding current that the welding power source supplies to a consumable electrode, the welding power source being further configured to detect a value of the welding current during welding; and a deviation detector which detects a deviation of a weaving center from a welding line, wherein the deviation detector determines a resistance value variation on the basis of a difference between resistance values resulting from a height variation of the consumable electrode at left and right ends of the consumable electrode at left and right positions of the weaving from a value of the welding current during the welding that is obtained from the welding current value detected by a current detector, and detects a deviation of a weaving center from a welding line on the basis of the determined resistance value variation and information relating to both end positions of an amplitude of the weaving.

6. The arc-tracking welding apparatus according to claim 5 configured so that the high-frequency component can be larger than a DC component of the welding current supplied to the consumable electrode.

7. The arc-tracking welding apparatus according to claim 5 configured so that the welding current supplied to the consumable electrode can be output to have pulse waveforms.

8. The arc-tracking welding apparatus according to claim 5 configured so that the frequency of the high-frequency component can be 100 Hz or higher.

* * * * *